(12) United States Patent
Huante

(10) Patent No.: US 8,013,803 B2
(45) Date of Patent: Sep. 6, 2011

(54) DOUBLE SIDED VIDEO MONITOR

(76) Inventor: Xavier Huante, Carson, CA (US)

( * ) Notice: Subject to any disclaimer, the term of this patent is extended or adjusted under 35 U.S.C. 154(b) by 1085 days.

(21) Appl. No.: 11/673,440

(22) Filed: Feb. 9, 2007

(65) Prior Publication Data

US 2007/0188405 A1     Aug. 16, 2007

Related U.S. Application Data

(60) Provisional application No. 60/772,148, filed on Feb. 10, 2006.

(51) Int. Cl.
*G09G 5/00* (2006.01)
(52) U.S. Cl. .................................. 345/1.1; 361/679.02
(58) Field of Classification Search .................. 345/1.1, 345/1.2, 1.3; 361/679.01, 679.02
See application file for complete search history.

(56) References Cited

U.S. PATENT DOCUMENTS

| | | | |
|---|---|---|---|
| 4,621,814 A | 11/1986 | Stepan et al. | |
| 5,796,577 A | 8/1998 | Ouchi et al. | |
| 6,025,871 A | 2/2000 | Kantor et al. | |
| 6,094,341 A | 7/2000 | Lin | |
| 6,222,507 B1 | 4/2001 | Gouko | |
| 6,295,038 B1 | 9/2001 | Rebeske | |
| 6,346,927 B1 | 2/2002 | Tran et al. | |
| 6,522,309 B1 | 2/2003 | Weber | |
| 6,630,013 B2 | 10/2003 | Lee | |
| 6,670,950 B1 | 12/2003 | Chin et al. | |
| 6,788,532 B2 * | 9/2004 | Yang et al. | ......... 361/679.33 |
| 6,844,865 B2 | 1/2005 | Stasko | |
| 7,542,010 B2 * | 6/2009 | Lai | ......... 345/1.1 |
| 2001/0054986 A1 | 12/2001 | Leman | |
| 2002/0109662 A1 | 8/2002 | Miller | |
| 2002/0135535 A1 | 9/2002 | Muller | |
| 2003/0067416 A1 | 4/2003 | Kim | |
| 2003/0142469 A1 | 7/2003 | Ponx | |
| 2003/0212811 A1 | 11/2003 | Thornton | |
| 2004/0051679 A1 | 3/2004 | Ponx | |
| 2004/0196209 A1 | 10/2004 | Chen et al. | |
| 2004/0201545 A1 * | 10/2004 | Yamazaki et al. | ......... 345/1.1 |
| 2004/0046705 A1 | 11/2004 | Masazumi et al. | |
| 2005/0134524 A1 | 6/2005 | Parker et al. | |
| 2005/0264471 A1 * | 12/2005 | Yamazaki et al. | ......... 345/1.1 |
| 2008/0297431 A1 * | 12/2008 | Yuuki et al. | ......... 345/1.1 |

* cited by examiner

*Primary Examiner* — Lun-Yi Lao
*Assistant Examiner* — Tom V Sheng
(74) *Attorney, Agent, or Firm* — David A. Belasco; Belasco Jacobs & Townsley, LLP

(57) ABSTRACT

A double-sided video monitor has a pair of display panels mounted back-to-back. The panels are capable of displaying same or separate video signals at the same time. Each panel has an inset viewing area capable of displaying an additional video signal. Video input signals are received through a variety of connection protocols including Digital Video Interface (DVI), S-Video cable, YPbPr cable, composite cable, and VGA cable. Audio output devices are provided for each panel n receiving input from an audio harness. The output devices provide sound synchronized to either display panel or inset viewing area. The panels can be operated independently by individual controlling means, which include a plurality of control buttons for volume adjustment, picture adjustment, activation, deactivation, and so on. The monitor may have a single power supply providing power to one or more monitor controllers. The monitor can also be connected to a laptop, or similar computing device.

9 Claims, 5 Drawing Sheets

DOUBLE SIDED VIDEO MONITOR

RELATED APPLICATION

This application claims priority to U.S. Provisional Application Ser. No. 60/772,148 filed on Feb. 10, 2006.

FIELD OF INVENTION

This invention relates to the field of display systems. More particularly, the invention relates to double-sided video monitors capable of concurrently displaying data/images from multiple inputs.

BACKGROUND OF THE INVENTION

It is widely observed that two television sets or monitors are combined as one unit in a back-to-back relationship with respect to one another so as to enable viewers to have opposite standing views. This arrangement can be found in railway stations, hospitals, bus stations, and similar locations. For such applications, a single monitor or a television set with two display panels combined back-to-back would be most appropriate. Several devices are found in the prior art which provide the desired double functionality, but they are not specifically designed for the described applications.

U.S. Patent Application No. 2002/0109662 to Miller discloses a dual screen computer output display comprising two display panels which can be placed in different viewing positions, one of which includes a back-to-back position. The display is primarily designed to be integrated with a laptop.

U.S. Patent Application No. 2003/0142469 to Ponx discloses a double screen laptop which employs first and second display screens that are to be positioned in a back-to-back relationship with respect to each another. The laptop is ideal for business presentations, where the presenter can view the first screen while operating the laptop and the viewer can view the second screen while being seated opposite to the presenter.

In U.S. Pat. No. 6,094,341 to Lin discloses a notebook computer comprising first and second displays, which are pivoted together. The first and second displays can be folded back-to-back so that oppositely seated people can view the same image at the same time through the first and second displays.

Although the art disclosed above present two display screens or panels which can be positioned in a back-to-back relation, none of them enables a viewer to view two different video signals or images at the same. Also, all the display screens or panels that are described here are designed to be coupled with laptops and similar devices, but not as a conventional video monitor or a television set with two back-to-back display panels.

It is an objective of the present invention to provide a system that accepts video inputs from as many as four separate sources. It is a further objective to provide such a system that will display any two of these inputs on each of two back-to-back screens. It is a still further objective of the invention to provide the ability for a user of such a system to select the input he wishes to view in each screen at any time. Finally, it is an objective of the present invention to provide such apparatus that is durable, inexpensive and easy to use.

While some of the objectives of the present invention are disclosed in the prior art, none of the inventions found include all of the requirements identified.

SUMMARY OF THE INVENTION

The present invention addresses all of the deficiencies of prior art double-sided monitor inventions and satisfies all of the objectives described above.

(1) A double-sided monitor providing the desired features may be constructed from the following components. First and second display panels are provided. Each of the display panels has a viewing surface and a rear surface. The rear surface of the first display panel is disposed adjacent the rear surface of the second display panel. At least one controller is provided. The controller is electrically connected to each of the first and second display panels. The controller has inputs for at least two video signals and provides video input selection for each of the display panels. An electrical power supply is provided. The power supply is electrically connected to the controller.

(2) In a variant of the invention, audio outputs for each of the display panels are provided. Inputs for at least two audio signals are provided. The controller provides audio input selection for each of the display panels.

(3) In another variant, the display panels include liquid crystal display (LCD) technology.

(4) In still another variant, at least one of the first and second display panels further includes at least one inset viewing feature. The inset feature displays a selected video signal received by the monitor.

(5) In yet another variant, at least one of the first and second display panels further includes at least one inset viewing feature. The inset feature displays a selected video signal received by the monitor. The audio outputs for each of the display panels provides audio output selectively synchronized with any of the video signals displayed on any of the first and second display panels and the at least one inset viewing feature.

(6) In a further variant, input to the at least one controller is connected through at least one of Digital Video Interface (DVI), audio harness, S-Video cable, YPbPr cable, composite cable, and VGA cable.

(7) In still a further variant, each of the first and second display panels further includes a back light inverter. The inverter is connected to the controller through an inverter harness.

(8) In yet a further variant, each of the first and second display panels further includes an on screen Display (OSD) circuit board, the OSD board connected to the controller through an OSD harness.

(9) In another variant of the invention, the at least one controller includes a separate controller for each of the first and second display panels.

(10) In still another variant, the double-sided video monitor further includes a common power supply for both of the separate controllers.

(11) In yet another variant, the common power supply includes a power cord, an adapter connected to the power cord, a female XLR unit connected to the adapter, a male XLR unit removably connected to the female XLR unit and first and second input cables. Each of the cables has front and back ends, is connected at the front end to the male XLR unit and has first female connectors at the back end. A power switch assembly is provided. The power switch assembly has four connecting pins and a power switch connected to the pins. A first two of the pins is connected to the first female connectors. The power switch divides power transmitted through the first female connectors. A second two of the pins is connected to two second female connectors to first and second pairs of output cables. Each of the first and second pairs of cables is spliced together and connected to a male connector. Each of the male connectors is connected to one of the controllers.

(12) In a final variant, the first and second display panels are removably attached adjacent one another.

An appreciation of the other aims and objectives of the present invention and an understanding of it may be achieved by referring to the accompanying drawings and the detailed description of a preferred embodiment.

FIGURES

Reference Numerals

Figure 1A:
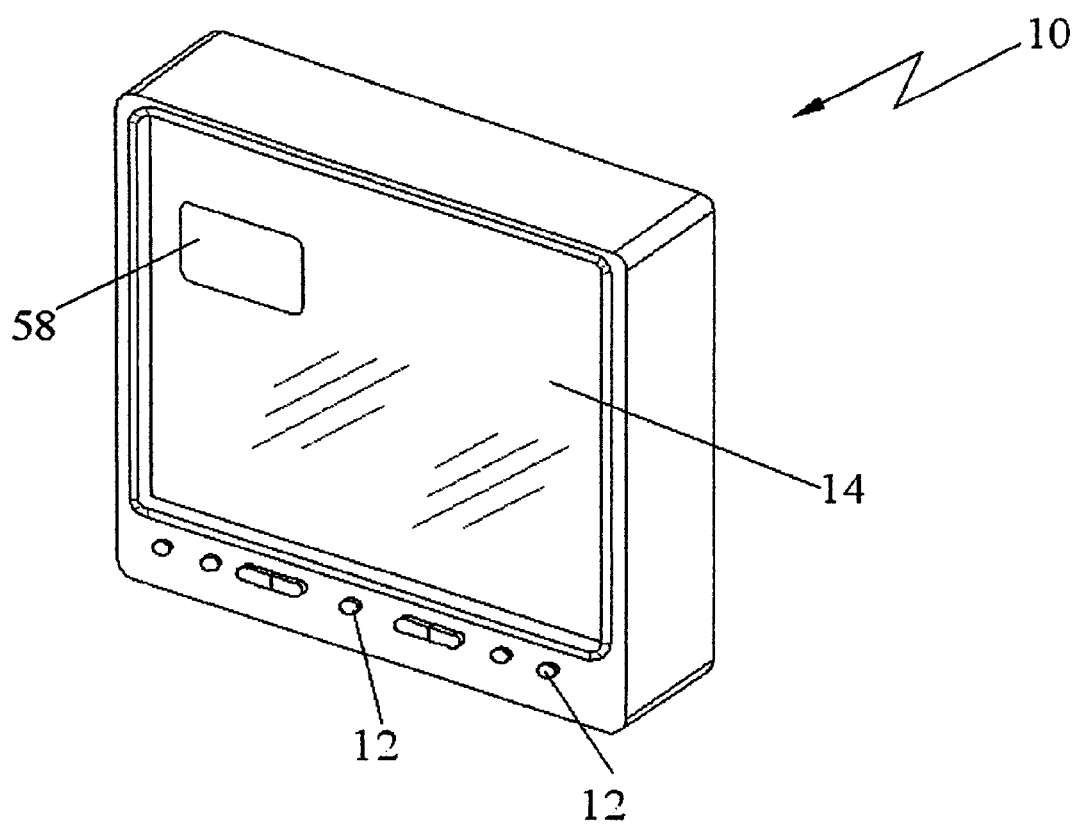
FIGS. 1A and 1B are perspective views of the front and rear of the double panel monitor in accordance with the present invention.
Figure 1B:
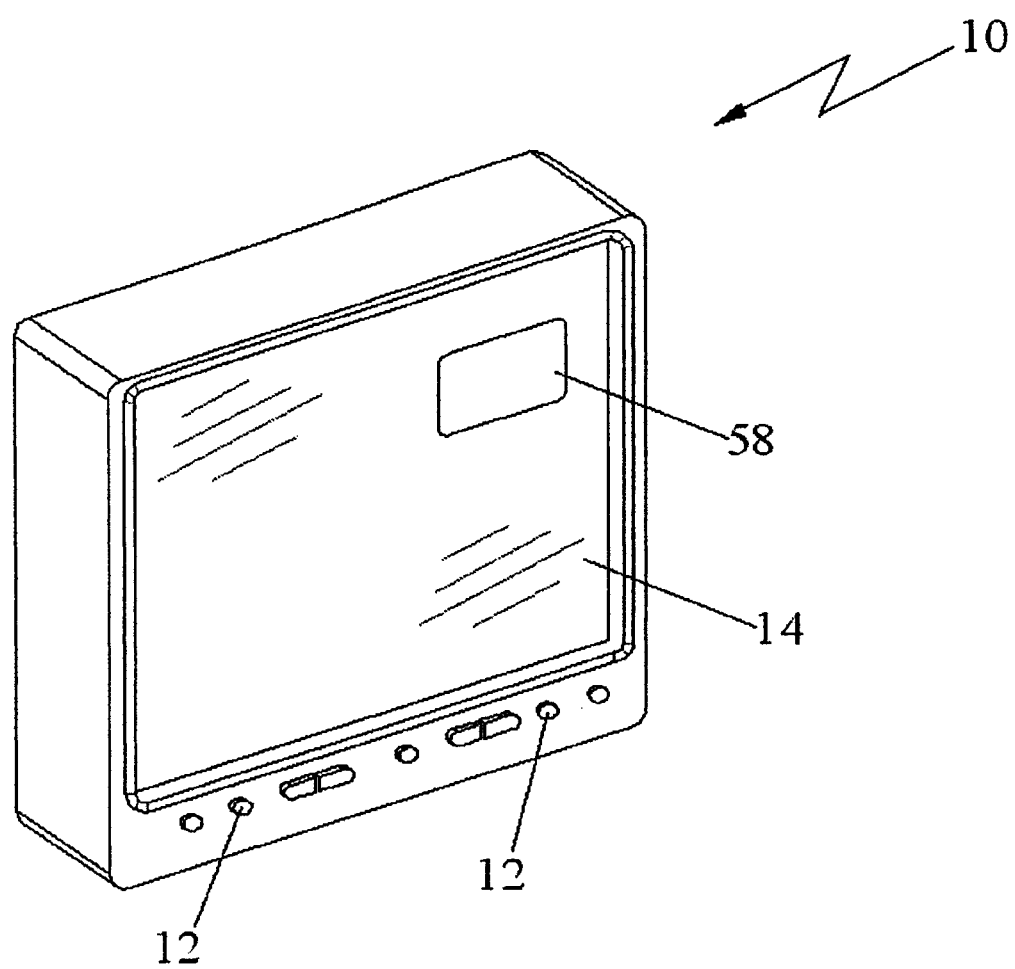

10 Double LCD Panel Display System
12 Control Button
14 LCD Panel
16 Power Cord
18 Adapter
20 Female XLR Unit
22 Male XLR Unit
24 Female Connector
26 Power Switch Assembly
28 Power Switch
30 Pin
32 Cable
34 Male Connector
36 DVI Cable
38 Audio Harness
40 S-Video Cable
42 YPbPr Cable
44 Composite Cable
46 VGA Cable
48 Controller
50 Back Light Inverter I
52 OSD Board
54 Inverter Harness
56 OSD Harness
58 Inset Viewing Area

DETAILED DESCRIPTION OF THE PREFERRED EMBODIMENT

The novel features of the present invention will become apparent from the following description of the preferred embodiment of the invention and as illustrated in FIGS. 1 through 4. The present invention is a double panel display system 10 that includes two Liquid Crystal Display (LCD) panels 14 attached together at their back sides, as shown in FIGS. 1A and 1B. Each LCD panel includes separate control buttons 12 to adjust features such as brightness, contrast, or other features typically included in an LCD monitor. The unit has the capability of showing two separate video signals, or the same video signal on the two LCD panels 14 at the same time. The monitor also has the capability to operate a single panel, while the other remains inactive.

The device 10 also has the capability of showing two different video images on a single LCD panel 14 to show a viewer the image from the opposite side of the monitor in a 'screen within a screen' configuration. A primary video image can appear all over the screen of the first panel 14A, and a secondary image can be displayed in a reduced size within the primary video image. The secondary video image can be from the second panel 14B that is connected on the backside of the first panel 14A. Alternately, the second video image can be from another source such as from a different channel.

Figure 2:
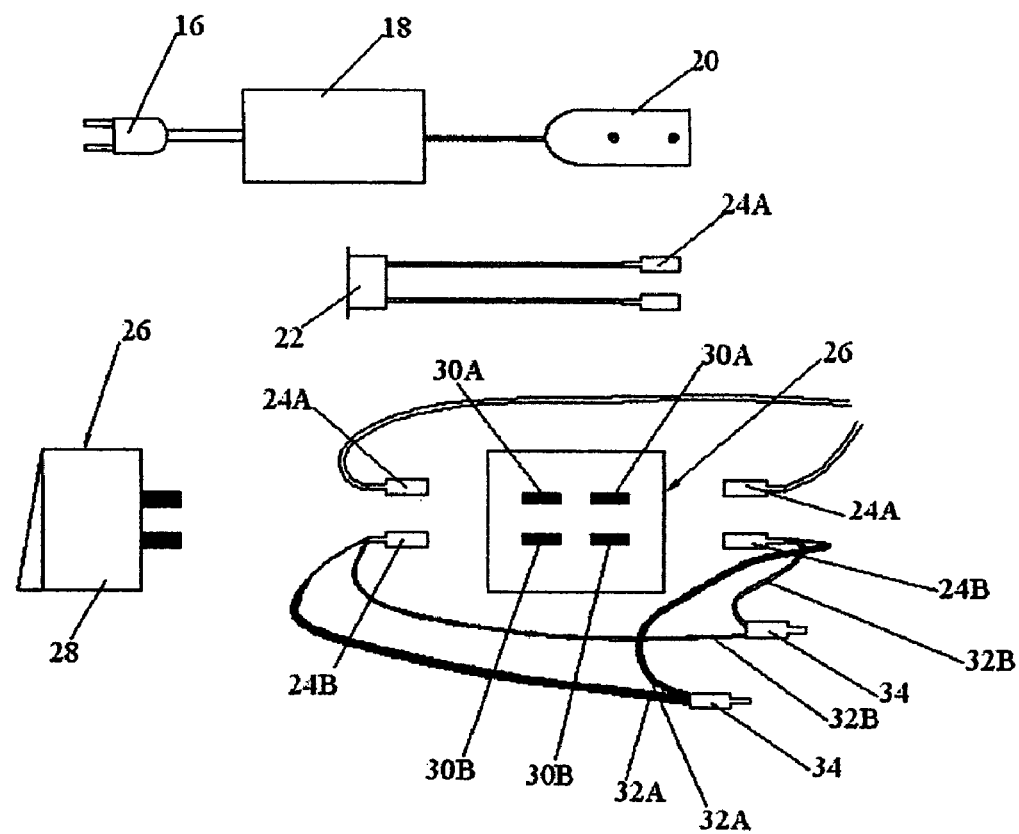
FIG. 2 is an illustration of the power distribution system of the FIG. 1 embodiment.

Referring to FIG. 2, the display system includes a common power supply for both the LCD panels. The power is supplied from an external source through a power cord 16, which is further connected to an adapter 18. A female XLR unit 20 is connected to the adapter 18 through a cable. The female XLR unit is further connected to its male counterpart 22.

Referring to FIG. 2, from the male XLR unit 22 the power is distributed through two cables, with the opposite end of each cable having a female connector 24A. These two cables, by the means of the female connectors 24A, are connected to first two pins 30A of a power switch assembly 26, which comprises four pins 30 and a power switch 28. From the power switch assembly 26, the power is divided and distributed through four cables 32, by means of two female connectors 24B which are connected to the last two pins 30B. Out of these four cables, two cables 32A are spliced together by a male connector 34. The other two cables 32B are also connected in the same fashion. Finally, the two male connectors 34 are connected to two controllers 48 of the two LCD panels 14.

Figure 3:
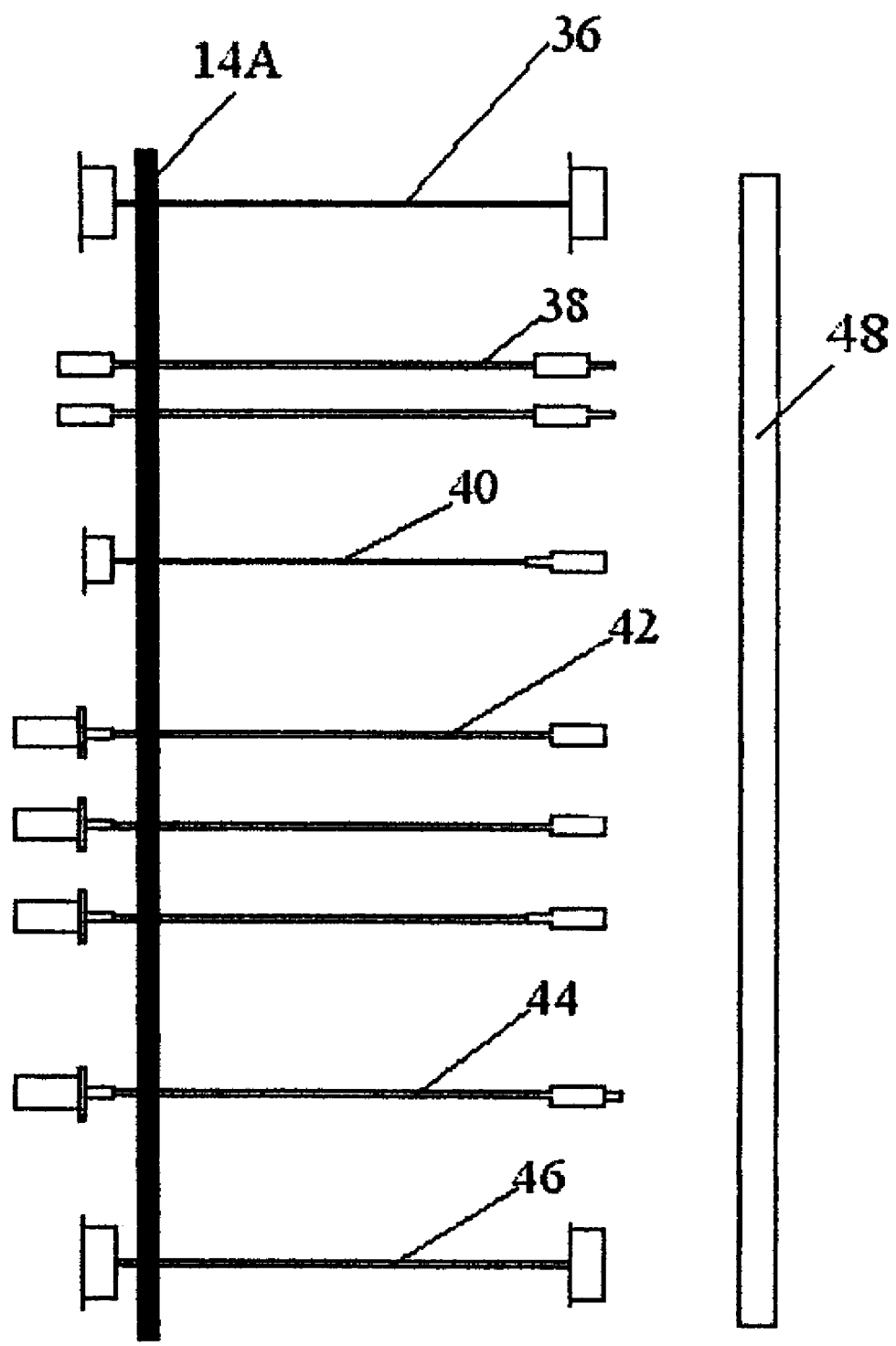
FIG. 3 is an illustration of various cables that establish connection between the controller and the double panel monitor of the FIG. 1 embodiment.

Referring to FIG. 3, one of the controllers 48 to which the power is supplied establishes a connection with the LCD panel 14A through a Digital Video Interface (DVI) cable 36, an audio harness 38, an S-Video cable 40, a YPbPr cable 42, a composite cable 44 and a VGA cable 46 as shown in the figure. The controller 48 includes suitable provisions to establish connections using the above cables. Similarly, the second controller is connected to the second LCD panel 14B.

Figure 4:
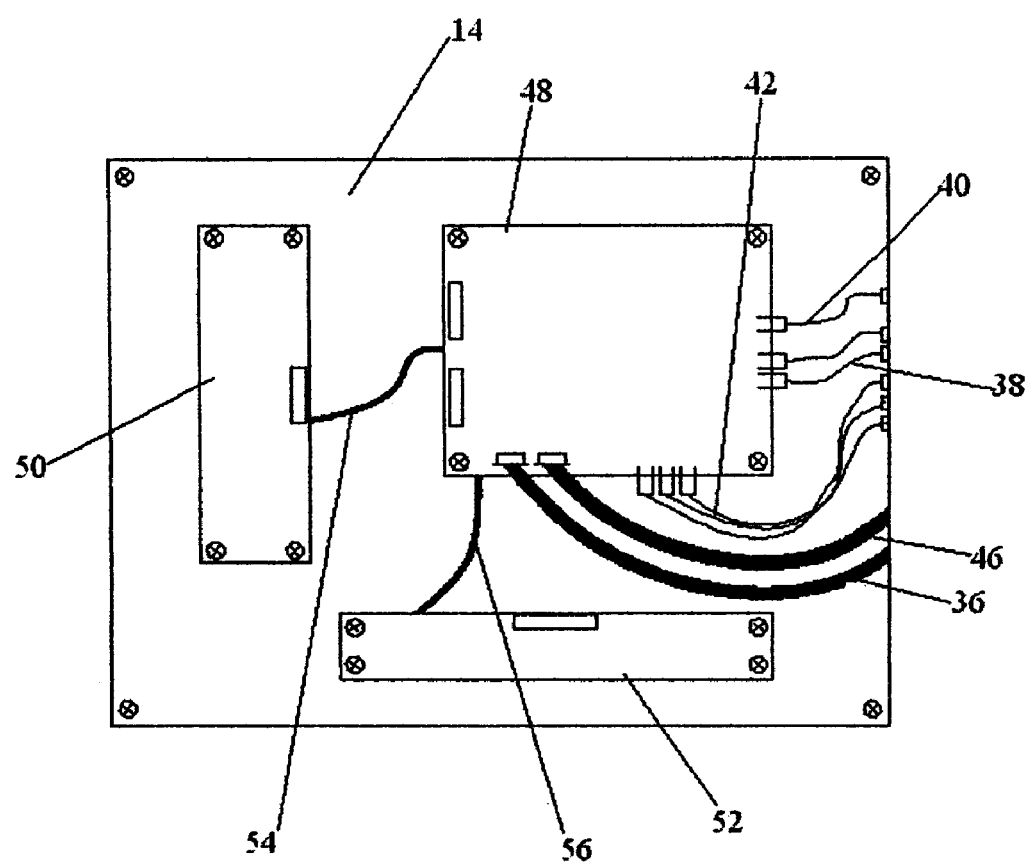
FIG. 4 is an illustration of the Printed Circuit Board (PCB) of the FIG. 1 embodiment.

Referring to FIG. 4, each LCD panel 14 includes a controller 48, a back light inverter 50, and an on screen display (OSD) board 52. The back light inverter 50 is connected to the controller 48 by means of an inverter harness 54. Similarly, the OSD board 52 is connected to the controller 48 by means of an OSD harness 56.

Following the set up described above, the two LCD panels 14 along with their corresponding assemblies and cables are integrated or assembled. The two LCD panels are attached back to back with suitable means such as a plurality of screws or the like.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

While specific systems and methods have been disclosed in the preceding description, it should be understood that these specifics have been given for the purpose of disclosing the principles of the present invention and that many variations thereof will become apparent to those who are versed in the art. For example, in another preferred embodiment, the LCD panels may be incorporated into a monitor, so that they are detachably connected.

The invention claimed is:

1. A double-sided video monitor, comprising:
first and second display panels, each of said display panels have a viewing surface and a rear surface; said rear surface of said first display panel being disposed adjacent said rear surface of said second display panel; a separate controller for each of said first and second display panels, said controllers being electrically connected to each of said first and second display panels;
said controllers having inputs for at least two external video signals and providing video input selection for each of said display panels;
a common electrical power supply, said common power supply electrically connected to both of said separate controllers;
said common power supply comprising:
  a power cord;
  an adapter connected to said power cord;
  a female XLR unit connected to said adapter;
  a male XLR unit removably connected to said female XLR unit;
  first and second input cables, each of said cables having proximate and distal ends, being connected at said proximate end to said male XLR unit and having first female connectors at said distal end;
  a power switch assembly, said power switch assembly having four connecting pins and a power switch connected to said pins;
  a first two of said pins being connected to said first female connectors;
  said power switch dividing power transmitted through said first female connectors; a second two of said pins being connected to two second female connectors to first and second pairs of output cables, each of said first and second pairs being spliced together and connected to a male connector; each of said male connectors being connected to one of said controllers.

2. The double-sided video monitor, as described in claim 1, further comprising:
  audio outputs for each of said display panels;
  external inputs for at least two audio signals;
  said controller providing audio input selection for each of said display panels.

3. The double-sided video monitor, as described in claim 2, wherein at least one of said first and second display panels further comprises:
  at least one inset viewing feature, said inset feature displaying a selected video signal received by said monitor;
  said audio outputs for each of said display panels providing audio output selectively synchronized with any of said video signals displayed on any of said first and second display panels and said at least one inset viewing feature.

4. The double-sided video monitor, as described in claim 1, wherein said display panels comprise liquid crystal display (LCD) technology.

5. The double-sided video monitor, as described in claim 1, wherein at least one of said first and second display panels further comprises:
  at least one inset viewing feature, said inset feature displaying a selected video signal received by said monitor.

6. The double-sided video monitor, as described in claim 1, wherein input to said at least one controller is connected through at least one of: Digital Video Interface (DVI), audio harness, S-Video cable, YPbPr cable, composite cable, and VGA cable.

7. The double-sided video monitor, as described in claim 1, wherein each of said first and second display panels further comprises a back light inverter, said inverter connected to said controller through an inverter harness.

8. The double-sided video monitor, as described in claim 1, wherein each of said first and second display panels further comprises an On Screen Display (OSD) circuit board, said OSD board connected to said controller through an OSD harness.

9. The double-sided video monitor, as described in claim 1, wherein said first and second display panels are removably attached adjacent one another.

* * * * *